(12) United States Patent
Deger

(10) Patent No.: US 7,530,368 B2
(45) Date of Patent: May 12, 2009

(54) VALVE DEVICE AND VALVE DISK FOR A VALVE DEVICE

(75) Inventor: Werner Deger, Kirchheim (DE)

(73) Assignee: Südmo Holding GmbH (DE)

( * ) Notice: Subject to any disclaimer, the term of this patent is extended or adjusted under 35 U.S.C. 154(b) by 29 days.

(21) Appl. No.: 11/563,541

(22) Filed: Nov. 27, 2006

(65) Prior Publication Data

US 2007/0151611 A1    Jul. 5, 2007

(30) Foreign Application Priority Data

Nov. 25, 2005    (DE)    ........................ 10 2005 057 103

(51) Int. Cl.
*F16K 1/44* (2006.01)
*F16K 11/20* (2006.01)
(52) U.S. Cl. ............................ 137/614.18; 137/614.17; 137/312
(58) Field of Classification Search ................. 137/312, 137/614.11, 614.17, 614.18, 614.19
See application file for complete search history.

(56) References Cited

U.S. PATENT DOCUMENTS

| 5,575,305 A | 11/1996 | Mieth ........................... 137/15 |
| 5,645,102 A | 7/1997 | Bräckelmann et al. ...... 137/238 |
| 5,806,554 A | 9/1998 | Mieth ......................... 137/240 |
| 6,178,986 B1 | 1/2001 | Burmester .................. 137/240 |
| 6,279,175 B1 * | 8/2001 | Blaney ........................ 137/542 |

FOREIGN PATENT DOCUMENTS

| DE | 93 20 801 | 2/1995 |
| EP | 0 646 741 | 4/1995 |
| EP | 0834689 A1 | 4/1998 |
| WO | WO 92/21900 | 12/1992 |
| WO | WO 98/41786 | 9/1998 |

OTHER PUBLICATIONS

International Search Report, Apr. 12, 2007, 3 pages.

* cited by examiner

*Primary Examiner*—Kevin L Lee
(74) *Attorney, Agent, or Firm*—St. Onge Steward Johnston & Reens LLC

(57) ABSTRACT

An aseptic valve device for the separation of hostile media including a housing which has connection pieces, each of specific opening cross section, for at least two pipelines which can communicate with one another in the housing via a connecting orifice of specific opening cross section, and a valve arrangement for the selective closing and release of the connecting orifice, the valve arrangement having at least one valve seat and at least one valve disk, the valve disk having a sealing face cooperating with the valve seat and a middle connecting portion which is connected to a valve stem, and the valve disk having a tubular extension which serves for the outflow of a medium, and a drainage portion extending obliquely or orthogonally with respect to the plane spanned by the sealing face of the valve disk and has a plurality of drainage orifices.

25 Claims, 2 Drawing Sheets

VALVE DEVICE AND VALVE DISK FOR A VALVE DEVICE

CROSS-REFERENCE TO RELATED APPLICATIONS

The present application claims priority of German patent application No. 10 2005 057 103.4 filed on Nov. 25, 2005.

FIELD OF THE INVENTION

The invention relates to a valve device for the separation of hostile media, comprising a housing which has connection pieces, each of a specific opening cross section, for at least two pipelines which can communicate with one another in the housing via a connecting orifice of a specific opening cross section, and a valve arrangement for the selective closing and releasing of the connecting orifice, said valve arrangement having at least one valve seat and at least one valve disk, the at least one valve disk having a sealing face cooperating with the at least one valve seat and a middle connecting portion which is connected to a valve stem, and the at least one valve disk having a downwardly extending tubular extension which serves for the outflow of a medium, the at least one valve disk having, in the region between the sealing face and the connecting portion, a drainage portion with at least one drainage orifice.

The invention relates, furthermore, to a valve disk for a valve device, with a sealing face and with a connecting portion for connection to a valve stem, with a tubular extension and with a drainage portion having at least one drainage orifice.

BACKGROUND OF THE INVENTION

A valve device and a valve disk of the type initially mentioned are known from the document EP-A-0 834 689.

Valve devices of this type are used, for example, in the foodstuff industry for the production of products, such as UHT milk, yoghurt and the like.

In valve devices of this type, there are stringent requirements as regards the reliable separation of the media carried by the at least two pipelines. The valve arrangement for the selective closing and release of the connecting orifice, via which the two pipelines can communicate with one another, must therefore, in the closing position, ensure that the connecting orifice is reliably sealed off. Moreover, the valve arrangement, including the at least one valve seat, must be capable of being cleaned thoroughly and, in particular, be sterilizable.

In order to satisfy these requirements, valve devices of the type initially mentioned are designed as double seat valves.

In the known valve device, the valve arrangement has, at the connecting orifice between the connection pieces of the at least two pipelines, two valve seats for two valve disks, an upper valve disk and a lower valve disk. To release the connecting orifice, the upper valve disk and the lower valve disk are moved downward, that is to say the known valve device is a downwardly opening double seat valve.

Between the two valve disks is located a leakage space which possesses an outflow via a tubular extension on the lower valve disk. In the closing position of the valve arrangement, in which the connecting orifice must be sealingly closed, a leakage and, consequently, a malfunction of the valve arrangement in its closing position can be detected via an outflow of a medium from the tubular extension.

The two valve disks are movable not only jointly, but also in relation to one another. To clean and sterilize the valve arrangement in the region of the leakage space, for example, the upper valve disk is slightly-lifted upward, so that it comes out of engagement with its valve seat. The lower valve disk in this case remains in its closing position. A cleaning medium can then be conducted under high pressure, which may be, for example, around 3 bar, into the leakage space via the upper pipeline. The cleaning medium then has to be discharged through the lower valve disk, which continues to bear sealingly against its valve seat, for which purpose the lower valve disk has a drainage portion which has at least one drainage orifice. In the known valve device, a plurality of small orifices are provided, the overall cross section of which amounts to less than half the opening cross section of each of the connection pieces. The tubular extension of the lower valve disk through which the cleaning medium flows out also has an opening cross section which is likewise at most half as large as the opening cross section of each of the connection pieces. Moreover, the overall cross section of the orifices in the lower valve disk is also markedly smaller than the opening cross section of the connecting orifice.

If, then, as described above, the leakage space between the two valve disks is acted upon by a cleaning medium of high pressure, for example through the upper connection piece, the cleaning medium cannot flow out through the drainage orifices in the drainage portion to the same extent as it is supplied through the connection piece. The result is that an additional overpressure builds up in the leakage space and may lead to the lower valve disk being moved from its valve seat, so that the cleaning medium passes into the second pipeline, which must in any case, however, be avoided.

In order to avoid this, either the leakage space would have to be acted upon, to be cleaned, with a lower throughflow rate and a lower pressure, although this may be detrimental to the cleaning action, or the lower valve disk or the upper valve disk, depending on whether the cleaning medium is supplied through the lower or the upper pipeline, would have to be held reliably in the closing position by means of a corresponding additional holding force.

Recent standards demand that the maximum cross section of each connection piece of the pipeline must correspond approximately to the cross-sectional opening of the leakage orifice of the lower valve disk. This could be implemented by reducing the opening cross section of the connection pieces, although this reduces the productivity of a device in which such a valve device is installed. The abovementioned requirement is not fulfilled by the known valve device.

However, solving this problem by increasing the overall opening cross section of the drainage orifices in the lower valve disk is difficult because the lower valve disk has a middle connecting portion, via which the lower valve disk is connected to a valve stem serving for the movement drive of the lower valve disk. Increasing the overall opening cross section of the drainage portion of the lower valve disk would therefore necessarily lead to an increase in diameter of the lower valve disk, although this is undesirable.

SUMMARY OF THE INVENTION

The object on which the invention is based is, therefore, to develop a valve device of the type initially mentioned, to the effect that the requirement for a larger outflow cross section of the valve disk can be fulfilled without an increase in diameter of the valve arrangement or with the valve arrangement having as narrow a build as possible, and without reducing the opening cross section of the connection pieces.

Accordingly, another object of the present invention is to design a valve disk of the type initially mentioned such that it has an increased opening cross section without an increase in diameter.

According to an aspect of the invention, a valve device for separating hostile media is provided, comprising a housing which has connection pieces each having a specific first opening cross section, for at least two pipelines which can communicate with one another in the housing via a connecting orifice of a specific second opening cross section, a valve arrangement for selectively closing and releasing the connecting orifice, the valve arrangement having at least one valve seat, and at least one valve disk, the at least one valve disk having a sealing face cooperating with the at least one valve seat, a middle connecting portion which is connected to a valve stem, and a tubular extension which serves for an outflow of a medium, a drainage portion arranged between the sealing face and the connecting portion, the drainage portion having at least one drainage orifice, wherein the drainage portion extends obliquely or orthogonally with respect to a plane spanned by the sealing face of the at least one valve disk, in such a way that an overall third opening cross section of the at least one drainage orifice amounts at least essentially to or is larger than at least one of the second opening cross section of the connecting orifice, the first opening cross section of at least one of the connection pieces.

According to another aspect of the invention, a valve disk for an aseptic valve device is provided, comprising a sealing face spanning a plane and having a cross-sectional area, a connecting portion for connection of the sealing face to a valve stem, a tubular extension having a first opening cross section, and a drainage portion having at least one drainage orifice, the drainage portion extending obliguely or orthogonally with respect to the plane spanned by the sealing face, in such a way that an overall opening cross section of the at least one drainage orifice amounts at least essentially to or is larger than at least one of the cross-sectional area defined by the sealing face, the first opening cross section of the tubular extension.

In the valve device according to the invention and the valve disk according to the invention, an increase in the area of the drainage portion is brought about due to the oblique or orthogonal position of the drainage portion with respect to the plane spanned by the sealing face of the at least one valve disk. In other words, the drainage portion of the valve disk according to the invention has an axial component which, depending on the oblique position of the drainage portion, makes it possible to adapt the overall opening cross section of the one or of the plurality of drainage orifices to the opening cross section of the connection piece or connection pieces or of the connecting orifice, without the diameter of the valve disk and, consequently, the valve arrangement as a whole having to be enlarged or the opening cross section of the connection pieces having to be reduced. Owing to the oblique or orthogonal position of the drainage portion, a larger space is available for the drainage orifices. Thus, when a cleaning medium is supplied through the corresponding connection piece into the leakage space, an essentially equalized balance is achieved in terms of the supply and discharge of the cleaning medium through the valve disk, thus avoiding the situation where an even higher pressure may build up in the leakage space in addition to the pressure of the cleaning medium. By means of the valve device according to the invention and the valve disk according to the invention, the abovementioned requirement that the maximum individual opening cross section of the connection pieces is no larger than the leakage cross section, with, on the other hand, a small diameter of the valve disk and of the tubular extension, can be fulfilled.

It is preferable, in this case, if the overall opening cross section of the drainage orifice/drainage orifices of the at least one valve disk deviates downward from the opening cross section of the at least one of the connection pieces and/or of the connecting orifice by no more than about 20%, preferably no more than 10%, further preferably no more than 5%.

Within the scope of the invention, in the regions mentioned above, the overall opening cross section may be smaller than, equal to or larger than the opening cross section of at least one of the connection pieces, although the overall opening cross section of the drainage orifice or drainage orifices is preferably larger, rather than smaller, than the opening cross section of at least one of the connection pieces and/or of the connecting orifice.

In a further preferred embodiment, the drainage portion of the at least one valve disk extends in the direction away from the tubular extension.

By virtue of this measure, although the axial overall length of the valve disk is increased, this is not a disadvantage, since the valve stem to which the valve disk is connected can be shortened to the same extent.

Alternatively to this, the drainage portion of the at least one valve disk may extend in the direction toward the tubular extension.

The advantage of this is an axially shorter type of construction of the at least one valve disk, since, in the embodiment, the drainage portion projects, starting from its sealing face, into the tubular extension.

In a further preferred embodiment, the drainage portion of the at least one valve disk is designed conically.

The advantage of this measure is that the valve disk can easily be produced on account of its geometrically simple shape.

In a further preferred embodiment, the drainage portion of the at least one valve disk has at least two drainage orifices which are separated by means of a corresponding number of spokes which are preferably arranged in a uniform distribution.

The spokes in this case merely have the function of connecting the valve disk sealing face, which is conventionally of annular design, to the connecting portion, that is to say of carrying the latter. The spokes are preferably designed with a low material thickness adapted to this function.

In the preferred embodiment, the at least one valve disk has at least three drainage orifices which are separated by at least three spokes which are preferably arranged at an angular spacing of 120°.

The provision of three spokes having, correspondingly, three drainage orifices, on the one hand, leads to a sufficient stability of the connection of the connecting portion to the sealing face, and, on the other hand, this design ensures a large space for the drainage orifices in terms of a high outflow capacity through the valve disk.

In a further preferred embodiment, the angle of inclination of the drainage portion of the at least one valve disk to the plane spanned by the sealing face is at least about 10°, preferably at least about 20°, further preferably at least about 30°.

The oblique position of the drainage portion with respect to the abovementioned plane is selected appropriately in terms of a maximum overall opening cross section of the drainage orifice or drainage orifices and, in practice, may even amount to 90°. Expediently, the angle of inclination will be governed, on the one hand, by the achievable overall opening cross section of the drainage orifice or drainage orifices and, on the other hand, by the outlay in terms of the production of the valve disk.

In a further preferred embodiment, the opening cross section of the tubular extension of the at least one valve disk amounts at least essentially to or is larger than the opening cross section of at least one of the connection pieces and/or of the connecting orifice and preferably deviates downward from this by no more than 20%.

In the known valve device, although the lower valve disk also has a tubular extension which would conform to this requirement, this tubular extension does not serve for the outflow of the leakage or cleaning medium, but, instead, for this purpose, the known valve disk has centrally a substantially thinner tubular extension which does not fulfill the abovementioned requirement.

Within the meaning of the present invention, the increased opening cross section, as described above, of the tubular extension, as an outflow for a medium, also contributes to avoiding a pressure build-up in the leakage space.

In a further preferred embodiment, the valve arrangement has a second valve seat and a second valve disk, the second valve seat and the first valve seat being formed at the connecting orifice, and the second valve disk is arranged above the first valve disk and has no drainage orifice.

This embodiment results in a double seat valve device with a leakage space between the two valve disks, and the valve device is suitable, overall, as a downwardly opening valve device.

In this respect and in conjunction with one of the abovementioned preferred embodiments, whereby the drainage portion of the at least one valve disk extends in the direction away from the tubular extension, it is preferred, furthermore, if the second valve disk extends obliquely downward from its center to its sealing face.

In this case, it is advantageous that the second valve disk is adapted to the shape of the valve disk according to the invention, and a valve arrangement with a short build is advantageously provided in the axial direction.

In terms of the abovementioned type of construction of the valve arrangement with a short build in the axial direction, it is preferred, furthermore, if the second valve disk is designed essentially complementarily to the drainage portion of the first valve disk.

Further advantages and features may be gathered from the following description and the accompanying drawing.

It will be appreciated that the features mentioned above and those yet to be explained below may be used not only in the combination specified in each case, but also in other combinations, without departing from the scope of the present invention.

BRIEF DESCRIPTION OF THE DRAWINGS

An exemplary embodiment of the invention is illustrated in the drawing and is described in more detail hereafter with reference to this in which.

DETAILED DESCRIPTION OF THE INVENTION

Figure 1:
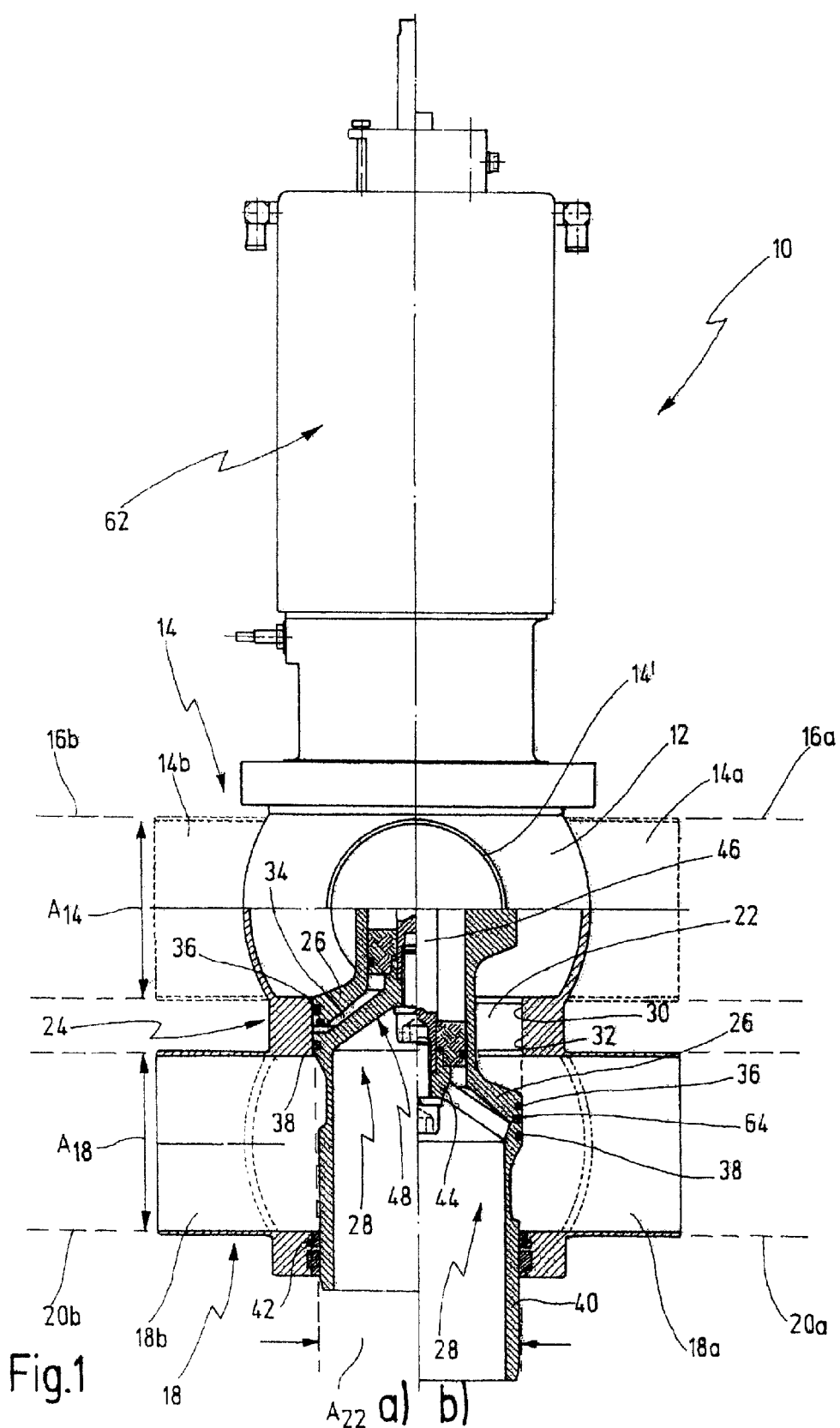
FIGS. 1a) and b) show together a valve device in an overall illustration in a side view, FIG. 1a) showing the valve device in an operating state in which the valve arrangement is closed, and FIG. 1b) showing the valve device in an operating state in which the valve arrangement is completely open.
Figure 2:
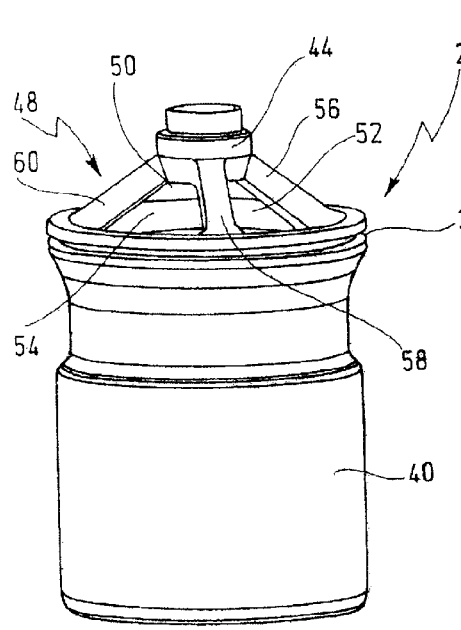
FIG. 2 shows a perspective side view of a valve disk of the valve device in FIG. 1.
Figure 3:
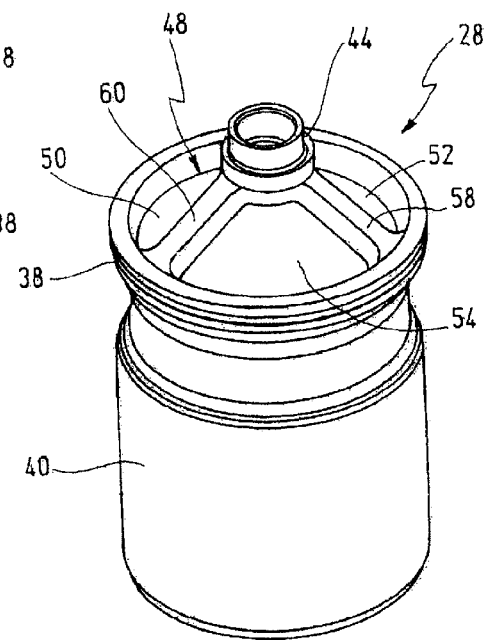
FIG. 3 shows the valve disk in FIG. 2 in a perspective view obliquely from above.

FIG. 1 illustrates a valve device, given the general reference symbol 10, for the separation of hostile media. The valve device 10 is used, for example, in a foodstuff technology plant which serves for the production of foodstuffs.

The valve device 10 has a housing 12 which is illustrated, closed, in the upper part of FIG. 1 and in longitudinal section in the lower part of FIG. 1.

The housing 12 has a connection piece 14a for connecting a pipeline 16a and, in alignment with the connection piece 14a, a connection piece 14b for connecting a pipeline 16b. However, the valve device 10 could also have only one of the two connection pieces 14a or 14b, so that the connection pieces 14a and 14b are designated below as connection pieces 14. FIG. 1 illustrates the connection piece 14 by broken lines, since it does not run in the drawing plane, but perpendicularly to this. The actual connection piece is designated by 14'.

The housing 12 has, furthermore, connection pieces 18a and 18b for connecting the valve device 10 to pipelines 20a and 20b, the connection pieces 18a and 18b again being in alignment with one another and being designated below as connection pieces 18. The connection piece 14 is arranged above the connection piece 18 when the valve device 10 is in the installation position.

The connection piece 14 has a predetermined opening cross section $A_{14}$ and the connection piece 18 a predetermined opening cross section $A_{18}$, which are of equal size in the exemplary embodiment shown.

In the housing 12, a connecting orifice 22 is present, via which the connection pieces 14 and 18 can communicate with one another when the connecting orifice 22 is not closed, as in FIG. 1b). By contrast, in FIG. 1a), the connecting orifice 22 is closed.

In the exemplary embodiment shown, the connecting orifice 22 is designed in the form of an annular space and has an opening cross section $A_{22}$ which is somewhat larger than the opening cross sections $A_{14}$ and $A_{18}$, although this does not necessarily have to be the case.

In the housing 12, a valve arrangement 24 is arranged, which has a first valve disk 26 and a second valve disk 28, the first valve disk 26 being arranged above the second valve disk 28.

Two valve seats 30 and 32 are present correspondingly in the connecting orifice 22, the first valve disk 26 having a sealing face 36 and the second valve disk 28 a sealing face 38, the sealing face 36 cooperating sealingly with the valve seat 30 and the sealing face 38 with the valve seat 32 when the valve disks 26 and 28 bear against the valve seats 30 and 32, as illustrated in FIG. 1a). Thus, in the operating position of the valve arrangement 24, as illustrated in FIG. 1a), the connection piece 14 is reliably separated from the connection piece 18, insofar as the sealing faces 36 and 38 cooperate properly with the valve seats 30 and 32.

Between the valve disks 26 and 28, a leakage space 34 is present, into which, in the closing position of the valve arrangement 24 according to FIG. 1a), a medium can flow from the connection pieces 14 or 18 only when one or both valve disks 26 and 28 do not cooperate properly with the valve seats 30 and 32.

The (lower) valve disk 28 is described in more detail hereafter with reference to FIGS. 2 to 5.

The valve disk 28, starting from its sealing face 38, already mentioned, has a tubular extension 40 which extends through the connection piece 18 when the valve disk 28 is in the installation position in the valve device 10. The tubular extension 40 is sealingly closed over the entire circumference at least in the region extending through the connection piece 18. According to FIG. 1, the tubular extension is sealed off relative to the connection piece 18 by means of a valve arrangement 42.

Furthermore, the valve disk 28 has in its middle region, centrally in the present case, a connecting portion 44, via which the valve disk 28, in its installation position in the valve device 10, is connected to a valve stem 46 (cf. FIG. 1), so that the valve disk 28 can be moved axially.

Between the sealing face 38 and the connecting portion 44, the valve disk 28 has a drainage portion 48 which has a plurality of drainage orifices, specifically, in the present case, three drainage orifices 50, 52 and 54. The drainage orifices 50, 52, 54 open into the inner space of the tubular extension 40.

The drainage orifices 50, 52 and 54 are separated from one another by three ribs or spokes 56 and 60, the spokes 56, 58 and 60 serving for connecting the connecting portion 44 to the tubular extension 40.

Whereas, in the preferred exemplary embodiment shown, three drainage orifices 50, 52 and 54 and, correspondingly, three spokes 56, 58 and 60 are present, even two or more than three such spokes and drainage orifices may be provided.

The spokes 56, 58 and 60 are spaced from one another at an angular spacing of 120°, that is to say uniformly.

The main part of the drainage portion 48 is occupied by the drainage orifices 50, 52, 54, whereas the spokes 56, 58 and 60 have a small material thickness, so that they occupy only a small part of the overall area of the drainage portion 48.

The drainage portion 48 is arranged obliquely or at an inclination with respect to a plane 62 spanned by the sealing face 38, with the result that the opening cross sections $A_{50}$, $A_{52}$ and $A_{54}$ of the drainage orifices 50, 52 and 54 are increased, because the overall area of the drainage portion 48 is increased due to the oblique position of the latter.

What is achieved thereby is that the overall opening cross section of the drainage orifices 50, 52 and 54, that is the sum of the opening cross section $A_{50}$, $A_{52}$ and $A_{54}$, can be essentially equated, without an increase in diameter of the valve disk 28, to the opening cross section $A_{14}$ of the connection piece 14 or to the opening cross section $A_{18}$ of the connection piece 18 or to the opening cross section $A_{22}$ of the connecting orifice 22. Should the opening cross sections $A_{14}$, $A_{18}$ differ from one another, the overall opening cross section of the drainage orifices 50, 52 and 54 may be adapted to the larger of the two opening cross sections $A_{14}$ and $A_{18}$.

In the exemplary embodiment shown, the overall opening cross section of the drainage orifices 50, 52 and 54 is about 10% above the opening cross section $A_{14}$ or $A_{18}$, which in the present case are equal. In general, the overall opening cross section of the drainage orifices 50, 52 and 54 should deviate at least downward from the opening cross section $A_{14}$ or $A_{18}$ by less than about 20%, preferably less than 10%, further preferably less than 5%.

Another possibility for adapting the overall opening cross section of the drainage orifices 50, 52 and 54 may be to equate this overall opening cross section at least essentially to the opening cross section $A_{22}$ of the connection orifice 22. Since, in the present exemplary embodiment, the opening cross section $A_{22}$ of the connecting orifice 22 corresponds essentially to the opening cross section $A_{14}$ or $A_{18}$, such adaptation is afforded automatically in the present case.

The angle of inclination β of the drainage portion 48 with respect to the plane 42 is about 35° in the exemplary embodiment shown, but may even be selected larger or smaller, in order to ensure a correspondingly large and sufficient overall opening cross section of the drainage orifices 50, 52 and 54, this also depending on the width of the spokes 56, 58 and 60. An oblique position of up to 90° (orthogonal position) may in this case be envisaged.

In the exemplary embodiments shown according to FIGS. 2 to 5, the drainage portion 48 of the valve disk 28 extends in the direction away from the tubular extension 40, that is to say the connecting portion 44 is drawn out from the tubular extension 40 or is spaced axially from the latter.

Figure 4:
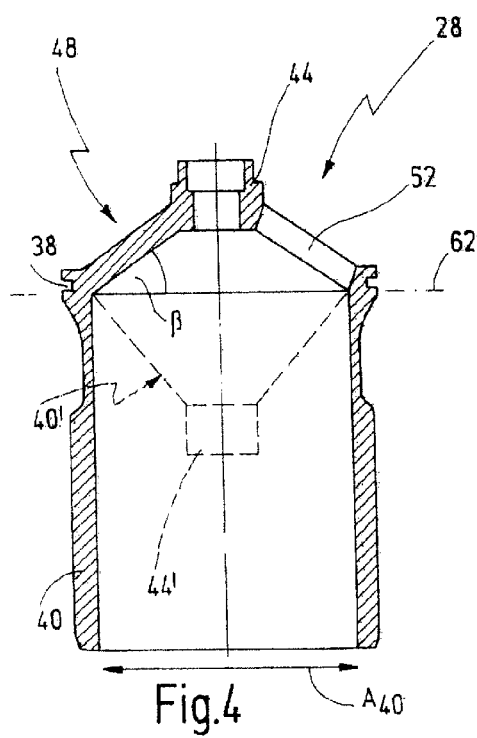
FIG. 4 shows a longitudinal sectional illustration of the valve disk in FIGS. 2 and 3 in a section along the line IV-IV in FIG. 5.
Figure 5:
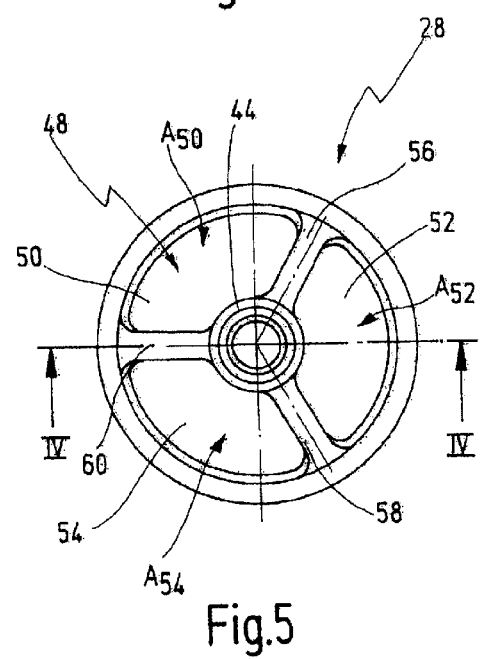
FIG. 5 shows the valve disk in FIGS. 2 to 4 in a top view.

FIG. 4, however, also illustrates by broken lines the opposite possibility that the drainage portion 48' of the valve disk 28 extends in the direction toward the tubular extension 40, that is to say, in this case, the connecting portion 44' is shifted into the tubular extension 40.

In the exemplary embodiment shown, the drainage portion 48 is designed conically, as seen from outside, a convexly curved or concavely curved or other geometric shape may also be considered.

The opening cross section $A_{40}$ of the tubular extension 40 is likewise adapted at least essentially to the opening cross section $A_{14}$ or $A_{18}$ or $A_{22}$, so that essentially the same quantity of medium can flow out through the tubular extension 40 as is supplied into the leakage space 34 by the connection piece 14 or the connection piece 18.

Again with reference to FIG. 1, the first valve disk 26 has a shape adapted to the drainage portion 48 of the valve disk 28. In the exemplary embodiment shown, the first valve disk 26 widens, as seen from its center, obliquely downward to its sealing face 36, so that the two valve seats 30 and 32 can be arranged so as to lie relatively closely to one another, as is the case in the present exemplary embodiment. As may be gathered from FIG. 1a), the first valve disk 26 is designed essentially complementarily to the drainage portion 48 of the valve disk 28.

Furthermore, in the upper region of the valve device 10, a drive unit 62, not illustrated in any more detail, is arranged, which operates preferably pneumatically and which serves for moving the valve disks 26 and 28 jointly or in relation to one another.

FIG. 1a) shows the closing position of the valve arrangement 24. Insofar as leakage at the sealing face 36 of the valve disk 26 or at the sealing face 38 of the valve disk 28 occurs in this closing position of the valve arrangement 24, leakage medium flows into the leakage space 34 and is conducted into the tubular extension 40 via the drainage portion 48 of the valve disk 28. Insofar as medium flows out through the tubular extension 40 in the operating position in FIG. 1a), this is evidence of a leakage situation.

FIG. 1b) shows the valve arrangement 24 in its open or release position, in which the connecting orifice 24 is open and the connection pieces 14 and 18 correspondingly communicate with one another.

So that the medium carried in the pipelines 16 and 20 does not penetrate into the tubular extension 40 of the valve disk 28, in this open position the valve disk 26 can be moved with respect to the valve disk 28 such that it is sealed off by means of an axially directed sealing face 64 relative to the valve disk 28, so that the medium cannot pass through the drainage portion 48 into the tubular extension 40.

In the event of a cleaning operation, for example, the valve disk 26 is slightly-lifted upward, while the valve disk 28 remains in its closing position in FIG. 1a). Via the connection piece 14, then, a cleaning medium, for example a cleaning lye, can be introduced into the leakage space 34 with a high flow rate and high pressure in order to clean the valve disks 26 and 28. Since the drainage portion 48 has drainage orifices with an overall opening cross section which corresponds essentially to the opening cross section of the connection piece 14, the cleaning medium can then flow out through the drainage portion 48 and the tubular extension 40, without an additional over-pressure building up in the leakage space 34 in addition to the in any case already present pressure of the cleaning medium.

This equalized balance between the supply and discharge of a medium into and from the leakage space 34 is achieved by virtue of the special design of the drainage portion 48 of the valve disk 28, without, for example, the connecting orifice 22 or the valve disk 28 and consequently the valve arrangement 24 having to be increased in diameter, and without the opening cross section $A_{14}$ of the connection piece 14 having to be reduced.

What is claimed is:

1. A valve device for separating hostile media, comprising:
   a housing which has connection pieces each having a specific first opening cross section, for at least two pipelines which can communicate with one another in said housing via a connecting orifice of a specific second opening cross section;
   a valve arrangement for selectively closing and releasing said connecting orifice, said valve arrangement having a first valve seat, and
   a first valve disk, said first valve disk having a sealing face cooperating with said first valve seat,
      a middle connecting portion which is connected to a valve stem, and
      a tubular extension which serves for an outflow of a medium, and
      a drainage portion arranged between said sealing face and said connecting portion, said drainage portion having a plurality of spokes extending between said sealing face and said connecting portion and separating a plurality of drainage orifices,
      wherein said plurality of spokes extend obliquely with respect to a plane spanned by said sealing face of said first valve disk, in such a way that an overall third opening cross section of said plurality of drainage orifices amounts at least essentially to or is larger than at least one of said second opening cross section of said connecting orifice, or said first opening cross section of at least one of said connection pieces,
   said valve arrangement having a second valve seat and a second valve disk, said second valve seat and said first valve seat being formed at said connecting orifice, said second valve disk being arranged above said first valve disk and has no drainage orifice.

2. The valve device of claim 1, wherein said overall third opening cross section of said plurality of drainage orifices of said first valve disk deviates down-ward from at least one of said first opening cross section of said at least one of said connection pieces, said second opening cross section of said connecting orifice by no more than about 20%.

3. The valve device of claim 1, wherein said overall third opening cross section of said plurality of drainage orifices of said first valve disk deviates down-ward from at least one of said first opening cross section of said at least one of said connection pieces, said second opening cross section of said connecting orifice by no more than about 10%.

4. The valve device of claim 1, wherein said overall third opening cross section of said plurality of drainage orifices of said first valve disk deviates downward from at least one of said first opening cross section of said at least one of said connection pieces, said second opening cross section of said connecting orifice by no more than about 5%.

5. The valve device of claim 1, wherein said drainage portion of said first valve disk extends in a direction away from said tubular extension.

6. The valve device of claim 1, wherein said drainage portion of said first valve disk extends in a direction towards said tubular extension.

7. The valve device of claim 1, wherein said drainage portion of said first valve disk is designed conically.

8. The valve device of claim 1, wherein said plurality of spokes comprise at least three spokes separating has at least three drainage orifices.

9. The valve device of claim 8, wherein said at least three spokes are arranged at an angular spacing of 120°.

10. The valve device of claim 1, wherein an angle of inclination of said drainage portion of said first valve disk to said plane spanned by said sealing face is at least about 10°.

11. The valve device of claim 1, wherein a fourth opening cross section of said tubular extension of said first valve disk amounts at least essentially to or is larger than said first opening cross section of said at least one of said connection pieces.

12. The valve device of claim 1, wherein said drainage portion of said first valve disk extends in a direction away from said tubular extension, and wherein said second valve disk is designed essentially complementarily to said drainage portion of said first valve disk.

13. A valve disk for a valve device, comprising:
   a sealing face spanning a plane and having a cross-sectional area;
   a connecting portion for connection of said sealing face to a valve stem;
   a tubular extension having a first opening cross section; and
   a drainage portion having a plurality of spokes extending between said sealing face and said connecting portion and separating a plurality of drainage orifices, said plurality of spokes extending obliquely with respect to said plane spanned by said sealing face, in such a way that an overall opening cross section of said drainage portion amounts at least essentially to or is larger than at least one of said cross-sectional area defined by said sealing face, said first opening cross section of said tubular extension.

14. The valve disk of claim 13, wherein said overall opening cross section of said plurality of drainage orifices deviates downward from said at least one of said cross-sectional area defined by said sealing face, said first opening cross section of said tubular extension by no more than about 20%.

15. The valve disk of claim 13, wherein said overall opening cross section of said plurality of drainage orifices deviates downward from said at least one of said cross-sectional area defined by said sealing face, said first opening cross section of said tubular extension by no more than about 10%.

16. The valve disk of claim 13, wherein said overall opening cross section of said plurality of drainage orifices deviates downward from said at least one of said cross-sectional area defined by said sealing face, said first opening cross section of said tubular extension by no more than about 5%.

17. The valve disk of claim 13, wherein said drainage portion extends in a direction away from said tubular extension.

18. The valve disk of claim 13, wherein said drainage portion extends in a direction toward said tubular extension.

19. The valve disk of claim 13, wherein said drainage portion is designed conically.

20. The valve disk of claim 13, wherein said plurality of spokes comprise at least three spokes separating at least three drainage orifices.

21. The valve disk of claim 13, wherein an angle of inclination of said drainage portion to said plane spanned by said sealing face is at least about 10°.

22. The valve disk of claim 13, wherein an angle of inclination of said drainage portion to said plane spanned by said sealing face is at least about 20°.

23. The valve disk of claim 13, wherein an angle of inclination of said drainage portion to said plane spanned by said sealing face is at least about 30°.

24. The valve disk of claim 13, wherein said first opening cross section of said tubular extension amounts at least essentially to or is larger than said overall opening cross section of said plurality of drainage orifices.

25. The valve disk of claim 24, wherein said overall opening cross section of said tubular extension deviates downward from said overall opening cross section of said plurality of drainage orifices by no more than 20%.

* * * * *